May 23, 1967   K. E. DAVIS ET AL   3,321,270
PROCESS FOR MANUFACTURE OF CYANATES
Filed Nov. 18, 1963
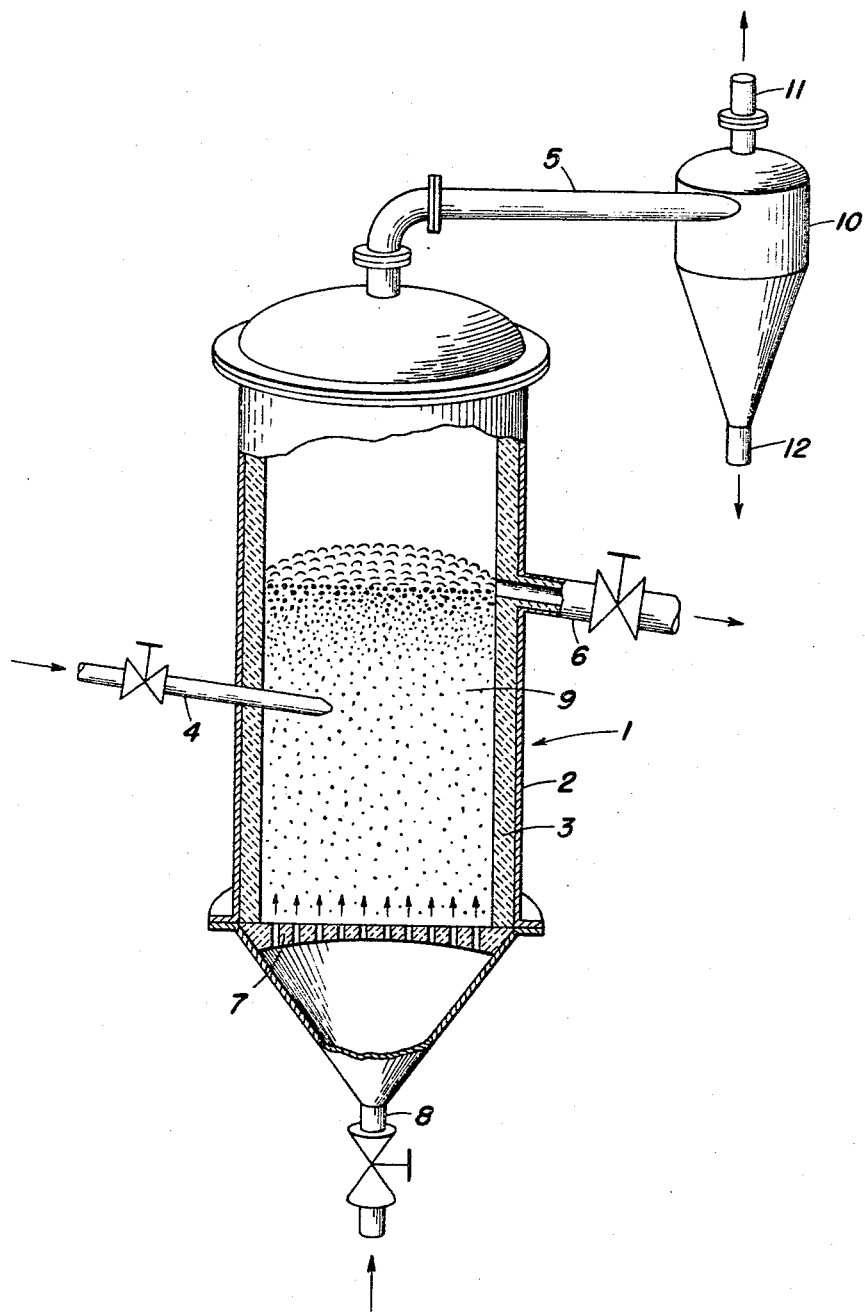
INVENTORS
Kenneth E. Davis
Charles F. Deck
BY Arnold L. McMaster
Bernhard R Swick
ATTORNEY United States Patent Office 3,321,270
Patented May 23, 1967

3,321,270
PROCESS FOR MANUFACTURE OF CYANATES
Kenneth E. Davis, Taylor, Charles F. Deck, Trenton, and Arnold L. McMaster, Lincoln Park, Mich., assignors to Wyandotte Chemicals Corporation, Wyandotte, Mich., a corporation of Michigan
Filed Nov. 18, 1963, Ser. No. 324,504
13 Claims. (Cl. 23—75)

This invention relates to the production of cyanates of alkali metals and particularly to the production of cyanates of alkali metals from urea.

Inorganic cyanates, particularly the alkali metal cyanates, have been prepared by the reaction of urea or of ammonia and carbon dioxide with salts and bases of the alkali metal. These processes have had particular disadvantage and limited applicability since low yields are obtained and the purity of the product has not been favorable. The production of the cyanates by reacting the alkali metal salts or bases with urea is considerably hindered because the formation of by-products and side reactions present difficulty in their separation from the final product and thereby decreases yield and purity. Yields in excess of about 85% and high purity of the products, i.e. greater than 90% are not readily obtainable. Generally speaking, the product has been separated from the reaction mixture by recrystallization in alcohol-water solutions or in water alone. This recrystallization is satisfactory only to a limited extent inasmuch as hydrolysis of the product occurs and the yield is therefore reduced. Similarly, low yields and purity are inherent when ammonia and carbon dioxide are reacted with the alkali metal salts or bases. In addition the latter process has the disadvantage of requiring high temperatures and pressures. Therefore, a process which would produce the alkali metal cyanates in high purity and high yield from readily available, low-cost raw materials and overcome the above disadvantages would be of particular benefit to the art.

One of the most common processes involves reaction of urea with alkali metal carbonates. In addition to the above disadvantages, this process is generally a fusion process resulting in a solid product which must be ground or milled to obtain a product in particulate form.

Some of the above disadvantages of the prior art are overcome by the method disclosed in U.S. Patent No. 2,801,154, wherein alkali and alkaline earth metal compounds are premixed with a finely divided urea and the mixture is heated. According to this process, it is essential that the urea have a particle size less than about 20 microns and the alkali or alkaline earth metal compounds have particle sizes which are less than about 30 microns in order to produce the desired high purity metal cyanates with high yields. That is to say, both reactants consist of particle sizes less than 20 microns and preferably less than 5 microns. This patent teaches that the mixture should be heated to a temperature not greater than about 200° C. and preferably between 140° and 180° C. Moreover, it is important for the thickness of the mixture of reactants to be below about 2 inches and preferably less than about ½ inch.

The latter process has certain inherent disadvantages resulting from the necessity for employing a solid particulate starting material wherein the urea has a particle size less than 20 microns and the metal compound has a particle size less than 30 microns and preferably less than 5 microns for both reactants. This requires an expensive pretreatment of the material including grinding steps to the desired size, and production with a limited thickness of reactants in particulate form with the attendant disadvantages and expense attending such treatment.

Further, when employing the prior art processes, the desired high purity and high yields are not obtained with aqueous solutions of any of the reactants and relatively pure reactants must be employed which further increases the difficulties and expense attending the practice of such processes.

Accordingly, it is a purpose of this invention to provide a method for producing alkali metal cyanates in high yields, i.e. yields in excess of 85% and preferably about 95% or better, and high purity, i.e. in excess of 90% and preferably about 95% or better, wherein solid materials, particularly non-aqueous materials, having a fine particle size, and limited thickness for the mixture of reactants, are not required.

The above and other purposes of this invention are accomplished by contacting a solution of urea and alkali metal hydroxide, preferably sodium hydroxide or potassium hydroxide, with at least one heated surface at a temperature of from about 250° C. to 600° C. The solution of urea and alkali metal hydroxide may be prepared from anhydrous materials or from aqueous solutions of the urea and alkali metal hydroxide. The alkali metal hydroxide employed may be an aqueous solution preferably containing at least 10% by weight alkali metal hydroxide, or the urea employed may be an aqueous solution containing at least 15% by weight urea, or combinations of these aqueous solutions may be employed. In any event the combined aqueous solution should preferably contain at least 5% by weight of alkali metal hydroxide and 7½% by weight of urea.

According to a preferred embodiment of the invention, a solution of urea and alkali metal hydroxide is projected, e.g., sprayed or otherwise caused to contact a surface of suitable material which is nonreactive with the reactants or products under the prevailing conditions such as ceramics, e.g. sand, high silica glass and metals including stainless steel, tantalum, nickel and high nickel alloys, e.g. Monel metal which is a nickel, copper alloy containing 68 to 70% nickel, 28% copper balance, small amounts of iron silicon etc. and impurities or sodium cyanate particles, which surface is maintained at a temperature of from about 250 to 600° C. During the reaction, water and ammonia are evolved and eliminated. In order to obtain the high yields desired, it is essential to maintain the temperature of the reaction above the minimum of 250° C. at all times. Further, it is necessary that the temperature should not be higher than the above-indicated 600° C. in order to obtain a pure product since operating at higher temperatures results in pyrogenic decomposition of the sodium cyanate. Accordingly, the above temperature range is essential to obtain the high yields, i.e. greater than 85%, and the high purity, i.e. greater than 90%. Almost any proportion of urea and alkali metal may be employed under some conditions. However, for the most practical operations a ratio of from about 0.8 to 1.4 mols of urea per mole of alkali metal hydroxide should be employed.

For best efficiency, the reaction is carried out in stoichiometric proportions and thus the proportions should be as close to stoichiometric as possible. Accordingly, in a preferred embodiment from about 1.0 to 1.2 mols of urea are mixed with each mole of alkali metal hydroxide. While elevated or reduced pressures may be employed, atmospheric pressure is preferred for convenience.

This reaction may be conducted in any suitable apparatus providing at least one heated solid surface of a material which is nonreactive with the reactants and products of this invention. For example, a slab of suitable material such as a ceramic or metal which is nonreactive with the reactants or products under the prevailing conditions having heating means such as electrical resistance-type heating elements embedded therein or affixed thereto or flame-type heating such as gas burners may be employed. The reactants, generally supplied as a mixture thereof, may be dropped onto the heated surface in liquid or solid form (e.g. in particulate form) from a suitable hopper or conduit. When solid particles are dropped onto the heated surface which is at a temperature greater than 250° C., they immediately melt and form a solution as the term is employed herein and thus even in this embodiment a solution of urea and alkali metal hydroxide is contacted with the heated surface. It has been observed that such solution forms before the anhydrous mixture reaches a temperature of 100° C. which is below the melting point of either reactant alone. For convenience in handling, it is preferred to employ a liquid or aqueous mixture of the reactants and spray the mixture onto the heated surface. Suitable means such as a fume hood may be employed to remove the volatile materials. In lieu of the heating means described above the material forming the reaction surface may be suitably supported in an enclosed furnacing means provided with an outlet for the volatile materials and an inlet conduit or nozzle for dropping or impinging the reactant mixture onto the heated surface. Upon completion of the reaction and removal of the volatile materials, the solid product may be removed from the heated surface for use.

While the process of this invention may be carried out by impinging, projecting, dropping or in other ways contacting the mixture of urea and alkali metal hydroxide with a massive solid surface, it is preferred to contact the urea and alkali metal hydroxide with a fluidized suspension of heated, finely divided, solid particles at a temperature from about 250 to 600° C. Thus, instead of contacting the mixture with a single solid surface, it is contacted with a large number of surfaces, i.e. the surfaces of the solid particles. It is advantageous to employ particles of the desired alkali metal cyanate since once the particles have been built up they may be merely removed from the reactor without the necessity for separating the sodium cyanate from the base material. However, particles of materials other than the desired alkali metal cyanate which are nonreactive with respect to the reactants under the prevailing conditions and products of the process may also be employed, in which event the sodium cyanate produced is deposited as a coating on the particles. Suitable materials for such particles include silica sand and other crushed ceramics, or metal particles such as Monel, tantalum, titanium, or stainless steel. Where such particles are employed, a higher rate of fluidization is preferred which results in greater agitation, the attrition of which in turn results in constantly grinding off the alkali metal cyanate from the particles to form fines of alkali metal cyanate which pass out of the reactor. The cyanate may then be recovered by means of suitable equipment such as a cyclone separator. An alternative method is to remove the coated particles after a sufficient thickness of sodium cyanate has been deposited on the particles and subject them to the action of a ball mill or other attrition apparatus followed by separation of the alkali metal cyanate fines, which are worn off from the base particles, by suitable screening means. The treated base particles may then be reintroduced into the fluidized bed for further deposition.

Referring to the accompanying drawing schematically illustrating partly in cross-section a suitable apparatus for performing the method embodying the principles of this invention wherein a fluidized bed is employed, there is shown a vertically disposed cylindrical or tubular-type reactor 1 which may comprise an outer shell 2 of suitable material such as steel and which may be provided with a liner 3 of a suitable heat insulating refractory material which under the prevailing process condition will be nonreactive toward the reactants, products and reaction byproducts. The reactor is provided with a valved inlet conduit 4 having a spray nozzle provided or formed in the end thereof, an outlet conduit 5 at the top of the reactor and a valved side outlet conduit 6. Suitably disposed in the bottom or lower portion of the reactor 1 and functioning to support or retain fluidizable bed particles when in repose therein is a perforated grid or porous filter 7 which is also composed of a refractory material that is inert to the action of the gases and other materials fed into the reactor at the prevailing conditions. Also provided at the bottom of the reactor is a valve-controlled inlet conduit 8 which is in open communication with a source of a hot gas that is inert relative to the reactants and products at the prevailing conditions. A preferred gas is air due to its ready availability.

In employing an apparatus of the type shown in the drawing and described above for production of alkali metal cyanate, a sufficient quantity of alkali metal cyanate particles of from about 20 to 30 mesh and of the desired purity or of particles of particulate material inert with respect to the reactants and products of this invention at the prevailing conditions having a particle size of from about 20 to 30 mesh is charged initially into the reactor through a suitable opening or conduit (not shown) where it becomes supported on the apertured retaining plate 7. A continuous flow of the inert gas heated to a temperature of from about 250 to 650° C. by conventional heating means (not shown) is then charged into the system from the conduit 8 and upwardly through the perforated plate member 7 for flow into the reactor in consequence of which a suspended bubbling bed suspension 9 is formed in which the fluidized particles are maintained in constant agitation and ebullient motion in the reactor to expose their entire surfaces for contact throughout the subsequent reaction. The reactor 1 and bed 9 are brought to a preferred temperature of from about 400 to 500° C. by the heated gas entering through conduit 8, which gas is charged into the reactor prior to introducing the principal reactants. Additional heat may be supplied by suitable conventional heating means external or internal to the reactor (not shown). When the desired reaction temperature is reached, the inert gas flow is continued in order to maintain the bed in a fluidized condition and a feed solution comprising a mixture of the desired alkali metal hydroxide and urea which may be either a melt of anhydrous material or an aqueous solution and which is maintained at a temperature of from about 30 to 90° C. is then charged into the reactor through the conduit 4 and sprayed onto the particles.

As the reaction proceeds, the sodium cyanate formed deposits upon the suspended particles in the bed, causing them to grow and increase in size. When the particles reach the desired size they may be removed through the outlet 6 or through a suitable bottom discharge valve (not shown). The exhaust gases are permitted to leave the reactor through the outlet 5. These gases contain primarily air (or other fluidizing medium), ammonia, water vapor and alkali metal cyanate fines. Accordingly, suitable apparatus such as a cyclone separator 10 may be employed for removing these sodium cyanate fines. The air, ammonia and water vapor are removed from the top of the cyclone separator through the exhaust conduit 11 and the alkali metal cyanate fines removed from the bottom through conduit 12.

This apparatus may be employed for both batch and continuous operation. Where the particles initially charged to the reactor are sodium cyanate the urea and alkali metal hydroxide may be continuously added through the inlet 4 and sodium cyanate particles continuously withdrawn through outlet 6. The effect of removal of particles is counteracted by the creation of new particles of sodium cyanate from fines obtained by attrition, which serve as seed particles, and subsequent deposition of sodium cyanate on the fines, thus permitting continuous operation. Where the particles initially charged are other than sodium cyanate, continuous operation may be achieved by removing the sodium cyanate from the withdrawn particles in a manner such as described above, i.e. ball milling, screening and recycling the inert particles by recharging them to the reactor through a suitable inlet conduit (not shown). Alternatively, a high rate of gas flow which would vary with the size and other features of the apparatus and which is generally higher than that employed where the initial particles are alkali metal cyanate may be employed to remove the deposited alkali metal cyanate by attrition whereby the cyanate deposited on the particle is removed continuously as fines by separation in the cyclone separator 10, thus permitting a continuous operation without removing and recycling the inert particles. For a clearer understanding of the invention, the following specific examples are provided.

*Example I*

2657 grams of clean, white silica sand having a 20–30 mesh particle size are charged into a 5-inch diameter stainless steel fluid-bed reactor of the type shown in the accompanying drawing having an internal length of 3 feet measured from the porous plate to the top of the reactor. The particles of sand are fluidized by means of the upward flow through the porous plate into the reactor of air at a rate of about 12 cubic feet (STP) per minute, which air is forced through the apparatus by means of a compressor. The air is preheated to a temperature such that the fluid-bed suspension is maintained at a temperature of 460° to 490° C. throughout the course of reaction.

A 30° C. feed mixture consisting of 2806 grams of a 35.5% aqueous urea solution and 1194 grams of 50.6% aqueous sodium hydroxide solution providing a mol ratio of 1.1 to 1.0 of urea to sodium hydroxide is sprayed into the reactor and onto the particles at a rate of 9 pounds per hour. The reaction is allowed to proceed until all of the urea and sodium hydroxide have been introduced into the reactor. The bed is then cooled by means of flowing air, which is not preheated, through the bed, after which the air flow is stopped. The sodium cyanate-coated sand particles are removed from the reactor, treated in a ball mill to remove the sodium cyanate and the sodium cyanate separated from the sand by screening. When the sodium cyanate from the ball mill is combined with the fines from the cyclone separator, a yield of 89.7% based on sodium hydroxide is obtained. The material produced is 98% pure sodium cyanate in the form of a fine, white powdered product.

*Example II*

Sodium cyanate is prepared by contacting a solution of urea and sodium hydroxide with heated, fluidized particles of silica sand. The procedure employed and the proportions of ingredients, i.e. urea and sodium hydroxide, are the same as in Example I with the exception that the bed is maintained at a temperature of 300–350° C. A 92% yield of 96% pure sodium cyanate in the final form of a slightly aggregated, white powdery product is produced.

*Example III*

Sodium cyanate is prepared by contacting a solution of urea and sodium hydroxide with heated, fluidized particles of silica sand. The procedure employed and the proportions of ingredients, i.e. urea and sodium hydroxide, are the same as in Example I with the exception that the bed is maintained at 500–550° C. A 95% yield of 97% pure sodium cyanate in the final form of a slightly aggregated, white, crystalline product is produced.

*Example IV*

2839 grams of sodium cyanate having a 20–30 mesh particle size are charged to a stainless steel reactor of the type shown in the accompanying drawing having a 5-inch internal diameter and an internal length of 3 feet measured from the porous plate to the top of the reactor. The particles of sodium cyanate are fluidized by means of the upward flow through the porous plate into the reactor of air at a rate of 5–10 cubic feet (STP) per minute, which air is forced through the apparatus by means of a compressor. The air is preheated to 450° C. before being introduced into the reactor and the flow of the air through the reactor is continued for 30 minutes in order to heat the particles up to substantially the temperature of the air.

A 30° C. solution of 960 grams of urea and 663 grams of sodium hydroxide in 1775 grams of water providing a mol ratio of 1.00 to 1.01 of sodium hydroxide to urea is sprayed into the reactor and onto the particles at a rate such that the fluid-bed is maintained at a temperature of about 300° C. The reaction is allowed to proceed until all of the urea and sodium hydroxide has been introduced into the reactor. The bed is then cooled by flowing air which is not preheated through the bed, after which the air flow is stopped. The sodium cyanate is removed from the reactor and when combined with the fines from the cyclone separator a yield of 87% is obtained. The material produced is 90% pure sodium cyanate in the form of a slightly aggregated, white to grey, crystalline product.

*Example V*

2500 grams of sodium cyanate having a 30–100 mesh particle size are charged to a stainless steel reactor such as that shown in the accompanying drawing having a 5-inch diameter and an internal length of 3 feet measured from the porous plate to the top of the reactor and provided with a cyclone separator. The particles of sodium cyanate are fluidized by means of the upward flow through the porous plate into the reactor of air at a rate of 5–10 cubic feet (STP) per minute, which preheated air was forced through the apparatus by means of a compressor. The air is preheated to 330° C. before being introduced into the reactor.

An 80–90° C. solution of 60 weight percent of urea and 40 weight percent of sodium hydroxide providing a mol ratio of 1.0 to 1.0 of sodium hydroxide to urea is sprayed into the reactor and onto the particles at a rate such that the fluidized bed is maintained at a temperature of 250° to 300° C. The reaction is allowed to proceed as a continuous type operation with the urea and sodium hydroxide continuously added at a rate of 3 to 5 pounds per hour and sodium cyanate particles continuously withdrawn at a rate of 2 to 3 pounds per hour.

The run is continued for 6 hours after which the urea-soduim hydroxide feed and the air flow are stopped. The sodium cyanate remaining in the reactor is removed. The yield of sodium cyanate including the fines from the cyclone separator is 90%. The material produced is 95% pure sodium cyanate in the form of a slightly aggregated, white, crystalline product.

*Example VI*

Two kilograms of potassium cyanate having a 100–200 mesh particle size are charged to a stainless steel reactor of the type shown in the accompanying drawing having a 5-inch internal diameter and an internal length of 3 feet measured from the porous plate to the top of the reactor. The particles of potassium cyanate are fluidized by means of the upward flow through the porous plate into the reactor of air at a rate of 6–8 cubic feet (STP) per minute, which air is forced through the apparatus by means of a compressor. The air is preheated to 350° C. before being introduced into the reactor and the flow of the air through the reactor is continued for 30 minutes in order to heat the particles up to substantially the temperature of the air.

A 20° C. aqueous solution of 26.7 weight percent of urea and 23.3 weight percent of potassium hydroxide providing a mol ratio of 1.00 to 1.07 of potassium hydroxide to urea is sprayed into the reactor onto the particles at a rate of about 0.5 liters per hour. The reaction is allowed to proceed as a continuous type operation with the solution of urea and potassium hydroxide continuously added and potassium cyanate particles continuously withdrawn from the reactor.

The run is continued for 5 hours, after which the urea-potassium hydroxide feed and the air flow are stopped. The potassium cyanate remaining in the reactor is removed. The yield of potassium cyanate including the fines from the cyclone separator is 95%. The material produced is 97% pure potassium cyanate.

*Example VII*

An 80–90° C. solution of 20 grams of anhydrous sodium hydroxide and 33 grams of anhydrous urea having a 1:1.1 mol ratio of sodium hydroxide to urea is added dropwise over a period of 1 hour onto a stainless steel surface maintained at a temperature of 350° C., i.e. a conventional electrical hot plate having a stainless steel surface, comprising a stainless steel sheet with electric resistance heating elements attached to the side of the sheet opposite the surface onto which the mixture was dropped. The solid product is removed from the stainless steel surface. A 90% yield of 95% pure sodium cyanate in the form of a slightly aggregated, white, crystalline product is obtained.

*Example VIII*

935 grams of crushed high silica glass, i.e. 96% or more silica, having a 20–50 mesh particle size are charged to a high silica glass reactor of the type shown in the accompanying drawing having a 2.63-inch internal diameter and an internal length of 4 feet measured from the porous plate to the top of the reactor. The particles of ceramic are fluidized by means of the upward flow through the porous plate into the reactor of nitrogen at a rate of 3.2 cubic feet (STP) per minute, which nitrogen is forced through the apparatus from a high pressure cylinder. The nitrogen is preheated to 550° C. before being introduced into the reactor and the flow of the nitrogen through the reactor is continued for 30 minutes in order to heat the particles up to substantially the temperature of the nitrogen.

A 30° C. aqueous solution of 24.2 weight percent of urea and 15.5 weight percent of sodium hydroxide providing a mol ratio of 1.04 to 1.00 urea to sodium hydroxide is sprayed into the reactor and onto the particles at a rate of 2.5 pounds per hour. The rate of flow of nitrogen is sufficiently high to remove most of the sodium cyanate from the high silica glass particles by attrition whereby the sodium cyanate is carried out of the reactor by the fluidizing medium and recovered by the cyclone separator thereby providing for continuous operation 0.6 to 0.7 pound per hour of sodium cyanate are obtained.

The run is continued for 1 hour, after which the urea-sodium hydroxide feed and the air flow are stopped. The cyanate remaining in the reactor is removed. The yield of sodium cyanate is 92%. The material produced is 94% pure sodium cyanate in the form of a fine powder.

It is to be understood that various changes and modifications may be made in the foregoing without departing from the spirit of the invention and the scope of the appended claims.

We claim:
1. A process for preparing alkali metal cyanates comprising contacting a solution of urea and alkali metal hydroxide with at least one heated surface at a temperature of from about 250 to 600° C. and recovering the resulting alkali metal cyanate product.
2. The process of claim 1 wherein the mol ratio of urea to alkali metal hydroxide is from about 0.8 to 1.4 mols of urea per mol of alkali metal hydroxide.
3. The process of claim 2 wherein said urea and alkali metal hydroxide are anhydrous.
4. The process of claim 2 wherein said solution of urea and alkali metal hydroxide is an aqueous solution.
5. A process for preparing alkali metal cyanates comprising contacting an aqueous solution containing at least about 5% by weight alkali metal hydroxide and at least about 7.5% by weight of urea with at least one heated surface at a temperature of from about 250 to 600° C. and recovering the resulting alkali metal cyanate product.
6. A process for preparing alkali metal cyanates comprising contacting a solution of urea and alkali metal hydroxide with a fluidized suspension of heated, finely divided, solid particles of a material which is nonreactive with the reactants and products of this process at the prevailing conditions at a temperature of from about 250 to 600° C. and recovering the resulting alkali metal cyanate product.
7. A process for preparing alkali metal cyanates comprising contacting an aqueous solution containing at least about 5% by weight alkali metal hydroxide and at least about 7.5% by weight of urea with a fluidized suspension of heated, finely divided, solid particles of a material which is nonreactive with the reactants and products of this process at the prevailing conditions at a temperature of from about 250 to 600° C. and recovering the resulting alkali metal cyanate product.
8. The process of claim 7 wherein the mol ratio of urea to alkali metal hydroxide is from about 0.8 to 1.4 mols of urea per mol of alkali metal hydroxide.
9. The process of claim 7 wherein said process is a continuous process.
10. The process of claim 7 wherein said solid particles are particles of the desired alkali metal cyanate.
11. The process of claim 7 wherein said solid particles are particles of silica sand.
12. The process of claim 7 wherein said alkali metal hydroxide is sodium hydroxide.
13. The process of claim 7 wherein said alkali metal hydroxide is potassium hydroxide.

References Cited by the Examiner

UNITED STATES PATENTS

| | | | |
|---|---|---|---|
| 2,690,957 | 10/1954 | Ter Horst | 23—75 |
| 2,801,154 | 7/1957 | De Pree et al. | 23—75 |

FOREIGN PATENTS

| | | |
|---|---|---|
| 523,021 | 3/1956 | Canada. |

OSCAR R. VERTIZ, *Primary Examiner.*

B. H. LEVENSON, *Assistant Examiner.*